US007770205B2

(12) United States Patent
Frank

(10) Patent No.: US 7,770,205 B2
(45) Date of Patent: Aug. 3, 2010

(54) BINDING A DEVICE TO A COMPUTER

(75) Inventor: Alexander Frank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 11/039,165

(22) Filed: Jan. 19, 2005

(65) Prior Publication Data
US 2006/0161445 A1 Jul. 20, 2006

(51) Int. Cl.
G06F 7/04 (2006.01)
G06F 17/30 (2006.01)
G06F 12/00 (2006.01)
G06F 12/14 (2006.01)
G06F 13/00 (2006.01)
G06F 1/26 (2006.01)
G06F 11/00 (2006.01)
G11C 7/00 (2006.01)
H04N 7/16 (2006.01)
G08B 13/00 (2006.01)
G08B 21/00 (2006.01)
G08B 29/00 (2006.01)

(52) U.S. Cl. .................. 726/2; 726/21; 726/26; 726/27; 726/34

(58) Field of Classification Search ............. 726/2, 726/21, 26, 27, 34
See application file for complete search history.

(56) References Cited

U.S. PATENT DOCUMENTS 5,274,368 A * 12/1993 Breeden et al. ............. 340/7.2
5,771,354 A * 6/1998 Crawford .................... 709/229
6,704,873 B1 * 3/2004 Underwood ................. 726/12
7,076,652 B2 * 7/2006 Ginter et al. ................ 713/153
2002/0112171 A1 * 8/2002 Ginter et al. ................ 713/185
2004/0030912 A1 * 2/2004 Merkle et al. .............. 713/200
2004/0039924 A1 * 2/2004 Baldwin et al. ............. 713/189
2004/0054907 A1 * 3/2004 Chateau et al. ............. 713/175
2004/0123127 A1 * 6/2004 Teicher et al. .............. 713/193
2005/0108547 A1 * 5/2005 Sakai ......................... 713/182
2005/0213761 A1 * 9/2005 Walmsley et al. ........... 380/255
2005/0275866 A1 * 12/2005 Corlett ...................... 358/1.14
2005/0286476 A1 * 12/2005 Crosswy et al. ............ 370/338
2005/0289343 A1 12/2005 Tahan
2006/0075014 A1 * 4/2006 Tharappel et al. .......... 709/202
2006/0107328 A1 * 5/2006 Frank et al. .................. 726/26

OTHER PUBLICATIONS

Specification as filed for U.S. Appl. No. 11/022,493, filed Dec. 22, 2004.
International Search Report for PCT/US05/46539 mailed Jul. 9, 2008.
Written Opinion for PCT/US05/46539 mailed Jul. 9, 2008.

* cited by examiner

Primary Examiner—Kambiz Zand
Assistant Examiner—Benjamin A Kaplan
(74) Attorney, Agent, or Firm—Marshall, Gerstein & Borun LLP

(57) ABSTRACT

A device, such as a component or a peripheral, and corresponding computer are adapted to be bound such that the device will only operate with that computer after the binding process. Cryptographic messages are sent between the device and computer to confirm the relationship. When the device cannot confirm it is operating with the previously bound computer, the device reduces its own operating capability to render itself substantially useless until either unbound from that computer or a successful confirmation takes place. Methods for operation, binding and unbinding are also disclosed.

14 Claims, 6 Drawing Sheets

BINDING A DEVICE TO A COMPUTER

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made because the service provider will not allow them. The deactivated phone has no "salvage" value, because the phone will not work elsewhere and the component parts do not have a significant street value. When the account is brought current, the service provider will re-allow use of the device to make calls.

This model works well when the service provider, or other entity taking the financial risk of providing subsidized hardware, has a tight control on the use of the hardware and when the device has little salvage value. The business model does not work well when the hardware has substantial uses outside the service provider's span of control. Thus, a typical personal computer does not meet these criteria since a personal computer may have substantial uses beyond an original intent and the components of a personal computer, e.g. a display or disk drive, may have a significant salvage value.

SUMMARY

When providing pay-as-you-go computers or other hardware at a subsidized price, removable components, peripherals, or other devices, such as monitors and disk drives, represent a risk to the underwriter or service provider. Such devices can be stripped from the system and sold at a profit by the user resulting in a loss by the underwriter or service provider. Smart devices and corresponding base computer systems allow binding between the device and the computer such that the device will only work with its intended computer. A "grace period" is accommodated for manufacturing, installation and testing prior to requiring binding. After the grace period, unless bound to a computer, the device will not operate a full capability. Periodic authentication of the computer by the device ensures the device is still installed in its intended computer. Unbinding, that is, removing the relationship between device and computer is accomplished using a signed message. The devices so bound are able to communicate with the computer and, in one embodiment, have cryptographic capabilities and secure memory.

Computers and devices may be bound in relationships beyond a simple one-device to one-computer manner. That is, some computers may be configured for authentication by more than one device, or conversely, some devices may be configured to accept authentication messages from more than one computer. This may allow easier purchasing of multiple systems and benefit the related maintenance and administration of such systems by allowing some components to move within a set of pre-determined computers. While pay-per-use business models may extend to business enterprises or other workgroups, the binding of components to computers may have benefits even for purchased units. The binding of components to computers, individually and in groups, may discourage theft and other "component swapping" that can leave some systems impaired, if not unusable.

DETAILED DESCRIPTION OF VARIOUS EMBODIMENTS

Figure 1:
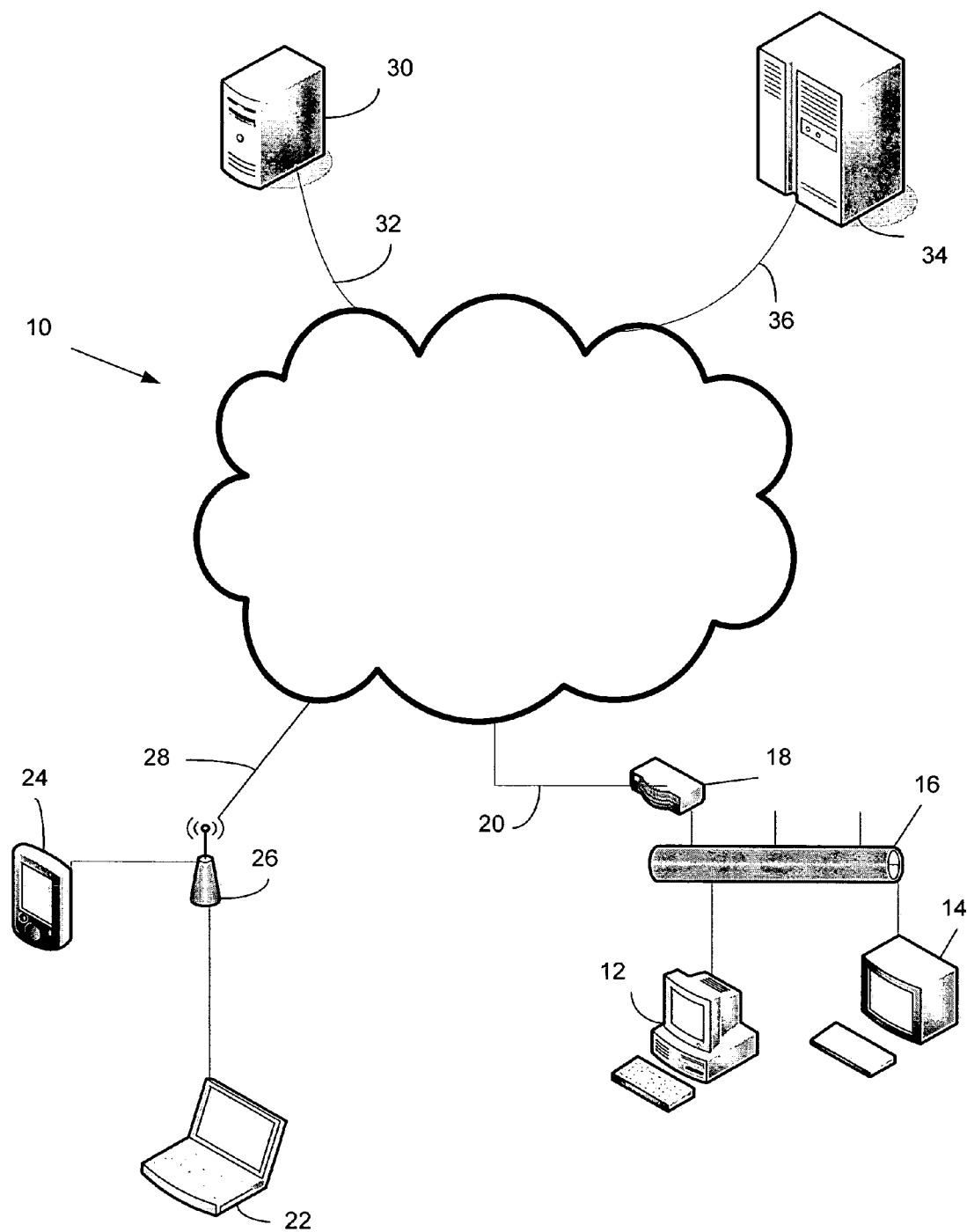
FIG. 1 is a simplified and representative block diagram of a computer network.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior-art high-value computers, personal digital assistants, organizers and the like are not suitable for use in a pre-pay or pay-for-use business model as is. As discussed above, such equipment may have significant value apart from those requiring a service provider. For example, a personal computer may be disassembled and sold as components, creating a potentially significant loss to the underwriter of subsidized equipment. In the case where an Internet service provider underwrites the cost of the personal computer with the expectation of future fees, this "untethered value" creates an opportunity for fraudulent subscriptions and theft. Pre-pay business models, where a user pays in advance for use of a subsidized, high value computing system environment have similar risks of fraud and theft.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
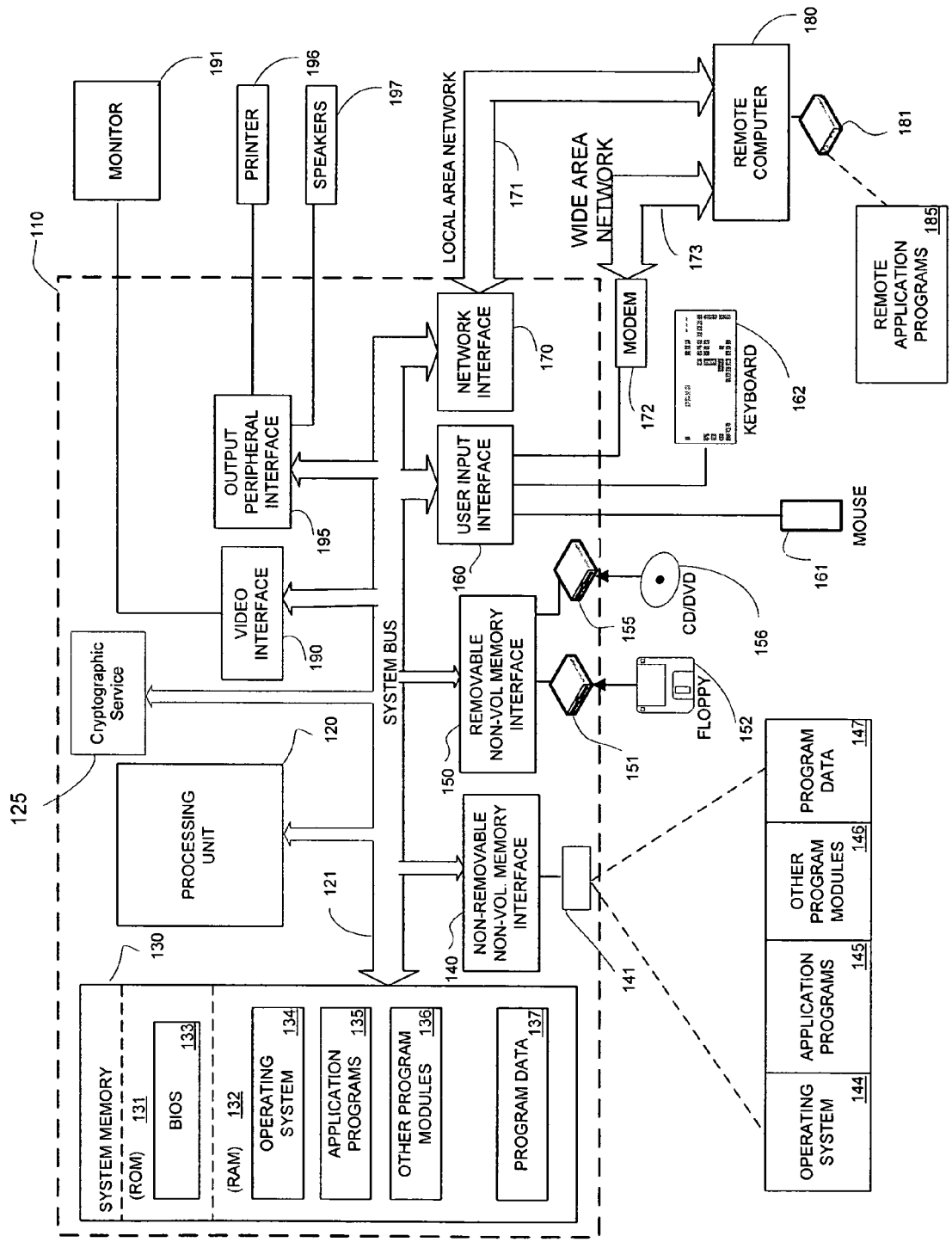
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include cryptographic services 125. Such services may include support for both symmetric and asymmetric cryptographic algorithms, key generation, random number generation and secure storage. Cryptographic services may be provided by a commonly available integrated circuit, for example, a smart chip such as those provided by Seimens™ or ST Microelectronics™.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
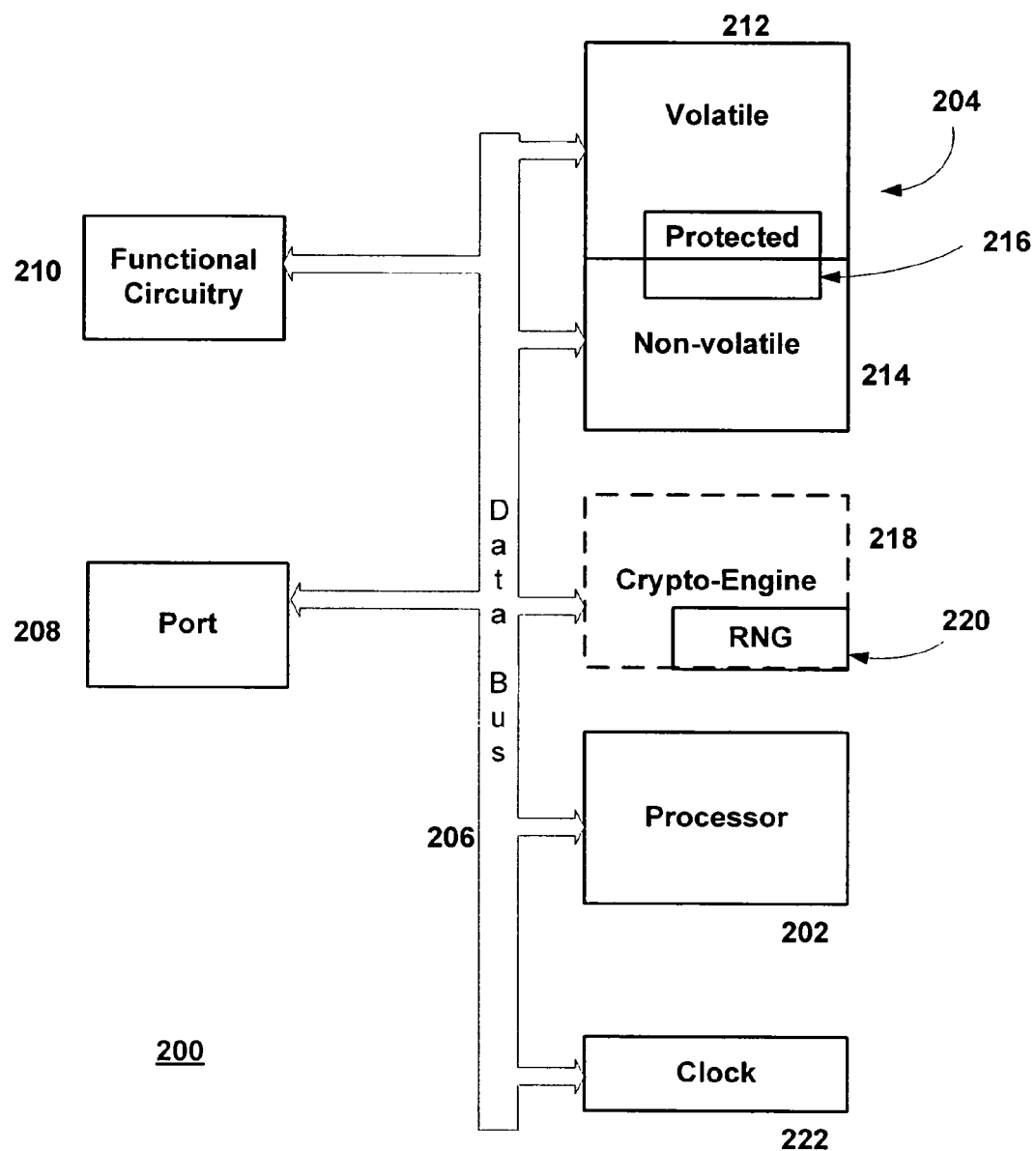
FIG. 3 is a block diagram of a device associated with the computer of FIG. 2.

Referring to FIG. 3, a device 200 that may be associated with a computer 110 is discussed and described. The device 200 may be any device that is separable from the computer or has value separate from the computer as a whole. For example, the device may be a display or a display controller, a rotating storage device, a rotating storage device controller, a solid state memory, a security device such as a firewall, a keyboard, a game controller, a mouse, a communication interface, a camera, a printer, a telephony device or another device that is generally portable between computers, such as computer 110.

The device may typically have a processor 202, memory 204, one or more data buses 206 coupling internal devices, a port 208 for communication with the computer 110, and functional circuitry 210 associated with the actual capability of the device, for example, disk controller circuitry, heads, platters, etc. (not depicted) on a hard disk drive 141 of FIG. 2. The processor 202 may be a single chip controller where the memory 202, port 208 and functional circuitry 210 are self-contained or the components may be discrete, or a combination thereof. The memory 204 may have both volatile 212 and non-volatile 214 memory both of which may include protected 216 or secure memory 216, that is, memory that may not be written to, and in some cases, read, without prior cryptographic authentication. In one embodiment, only the code running in the processor 202 has access to the memory 204, thus isolating it and making outside attacks more difficult. The components of the device 200 are known and available, for example, the processor may be a single chip controller, or even a micro-controller executing a small code set and state changes. The secure memory may be implemented using a smart chip, such as may be used in a smart card. The device 200 may optionally include a cryptographic engine 218 for performing hashing, key generation, and either or both symmetric or asymmetric cryptographic functions, for example, Advanced Encryption Standard (AES) or RSA™ respectively. When a cryptographic engine is not present, any required cryptographic functions may be implemented in software and executed by the processor 202.

When initialized, the device 200 may be capable of full operation for a short period of time to allow initial installation and testing. Extended periods of full operation may allow for retail configuration and demonstrations. At some point, however, the device 200 may require that it be bound to a computer, such as computer 110, to continue correct, or full capability, operation. The binding process involves the device 200 exchanging information with the computer 110 to which the device 200 is to be bound and is discussed further below.

Also, depending on the device, the device may be sufficiently functional to allow the computer to start, reset, and boot. Then, if the binding test fails, the device will move into a less functional state. The less functional state may be totally dysfunctional, or semi-functional—depending on business policies and device. The level of dysfunctional may allow for a repeated binding testing, or require restarting the computer 110 and/or device 200 which resumes to the initial state for pre-bind testing.

It may be desirable to expand the scope of binding beyond a one-to-one relationship. For example, in a business or workgroup it may be advantageous to allow a display to be used on any of several computers, thus reducing overhead when maintaining computer systems within the business or workgroup. In some cases, it may make sense to mix the binding relationships to allow single and group binding e.g. disk drives may be bound to single computers while displays and external drives may be bound to the group.

Any form of security may be found to have a weak point or a security hole. A design goal of this security measure, like many others, may be to make the cost of the attack, for example, a hardware rebuilding of a circuit board, more expensive than the cost of the device being protected. This may deter attacks altogether, but more likely will limit widespread attacks on the device 200 and the related computer 110.

Figure 4:
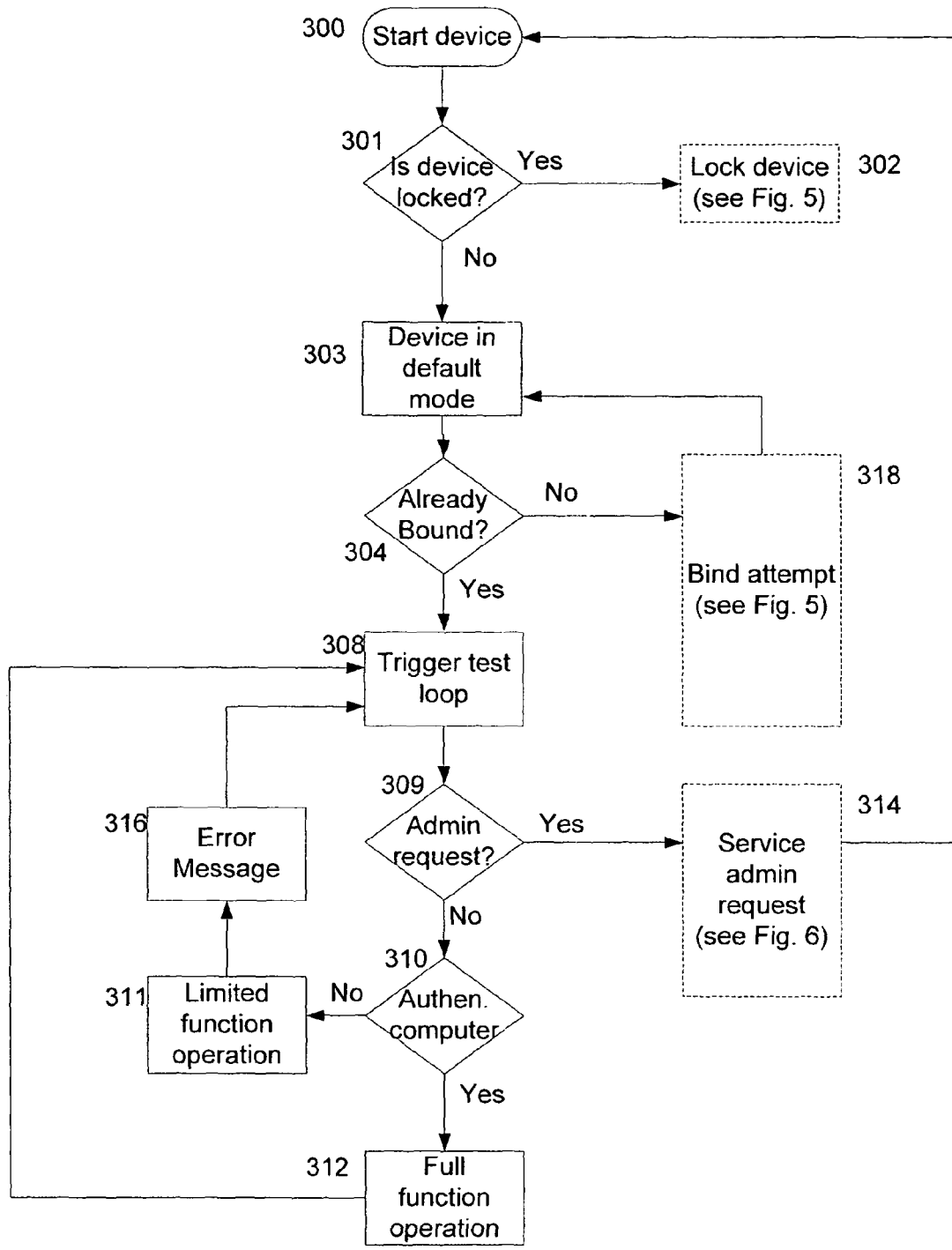
FIG. 4 is a flow chart depicting a method of operating a computer with a bound device.

Referring to FIG. 4, an exemplary method for configuring and operating a device bound to a computer is discussed and described. As mentioned above, there are a number of devices appropriate to operation in this manner, for example, device 200. After the device 200 is started 300, for example, after a change in power state, e.g. power up or standby-to-on, etc. or a reset. The device 200 may determine 301 if the device is already locked, or in a limited operation mode. If so, execution may follow the yes branch to 302, further depicted in FIG. 5. If not, the no branch may be followed where the device 200 may enter 303 a default mode. The device 200 may default to full operation and enter a limited function mode after failing an authentication cycle or the device may default to limited operation and enter full function mode after passing an authentication cycle. The default state may be configurable by the manufacturer or an authorized administrator. The device 200 may determine 304 if it is already bound to a computer 110. If not, the device 200 may attempt to bind itself to the computer 110 at 318, as described in FIG. 5. If so, the yes branch from 304 may be taken and the test loop triggered 308. The test loop may be triggered 308 by a volume of usage, a time period, a recent system event such as a reset or power cycle, or a random or pseudo-random event. The latter two may be clock-based or use a random number generator 220 of FIG. 3 to create an approximate period between testing. In one embodiment, the period between authorization cycles may be between 5 and 10 minutes. The specific functions available in the limited operation mode may vary by actual device. For example, a disk drive may only operate at a fraction of its communication speed, or a graphics controller may only operate in a low resolution mode. A trigger mechanism 308 may be used to begin the authorization process. During the test loop, the device may respond 309 to upending service administration request. The service administration request may be a request to unbind, i.e. disassociate from the computer 110, or it may include other requests, for example, unlocking from a limited function state, or resetting the binding criteria. The device 200 may place limits on how many service administration requests it will service before requiring completion of the test loop or other authenticated transaction. Placing a limit on service requests may limit attacks attempting to prevent the completion of the test loop by always diverting processing at this point. Service administration requests are also discussed with respect to FIG. 6.

If no service administration tests are pending the no branch from block 309 may be taken. The device 200 may authenticate 310 the computer 110. The authentication 310 may involve a cryptographic challenge and response, known in the security industry. A challenge/response may involve the device 200 supplying a random number and the computer 110 signing the random and returning it to the device 200. The response may optionally include a computer identifier, allowing the device 200 to confirm the computer 110 as well as a valid signature. The cryptographic mechanism may be chosen at the time of binding and is discussed in more detail with respect to FIG. 5. The device may require a response in a fairly short period of time to prevent the computer 110 from searching the Internet or other network for a suitable host for signing. That is, if a device 200 is bound to first computer and moved to a second computer, the second should not be able to forward the authorization request to the first computer. Alternatively, the device 200 may require that external communications be disabled during the authentication 310. This may be more easily accomplished when the device 200 is a communications controller. Requiring a response during a specified time interval may not only limit the effectiveness of request redirection, but may also help prevent attacks where the computer simply doesn't respond to the authentication request in an attempt to subvert the authentication process.

When the authentication succeeds, the device 200 may set itself to full function operation 312 and the method returns to the triggering phase 308 to await another authentication cycle. Authentication 310 may be repeated periodically to discourage the device from being moved to another system (i.e. with power applied) after an initial authentication.

If the authentication 310 fails or if the computer 110 does not support binding, the no branch from 310 may be taken, the device 200 may be set 311 or re-set to limited function operation and an error message may be displayed 316. It is a design choice whether the device 200 eventually ceases operation altogether after a number of failed attempts. When the device is not already bound, as determined at 304, the no branch may be taken and the device 200 may attempt to bind itself to the current computer (see FIG. 5). Alternatively, the device 200 may attempt to bind to the computer 110 in response to a specific command, for example, if sent by a technician during an installation process.

Figure 5:
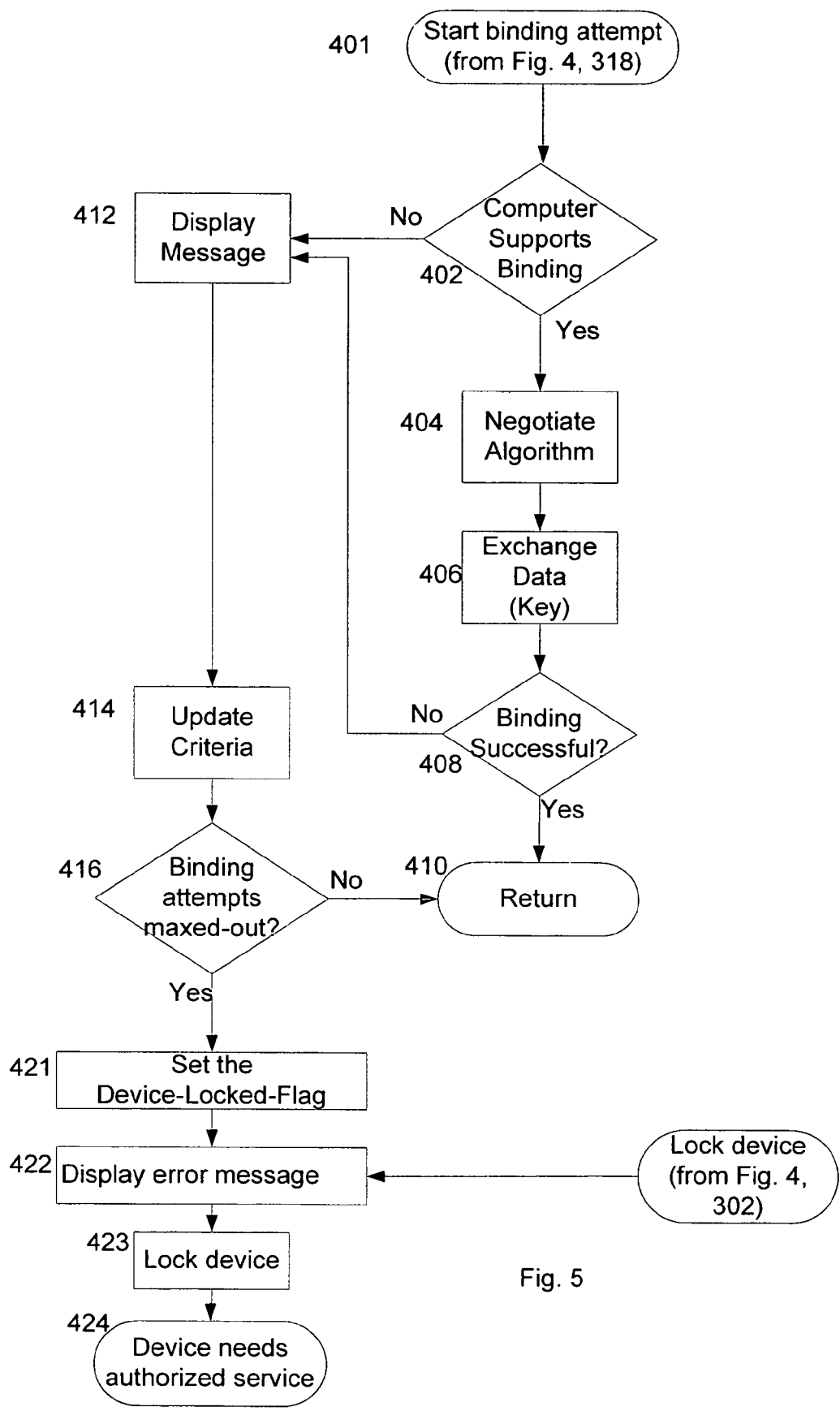
FIG. 5 is a flow chart depicting a method of binding a device to a computer.

FIG. 5 depicts a method of binding the device 200 to the computer 110. The computer 110 may begin 401 the binding attempt in response following the no branch from block 304 to block 318. The device 200 may first determine 402 if the computer supports binding by sending a message to the computer 110, for example, to a monitor program running in the computer 110. When the computer 110 supports binding, the computer 110 and device 200 may negotiate the method, or more specifically, a cryptographic algorithm, to be used for subsequent authentication. For example, they may agree to use a shared secret and symmetric encryption algorithms. In another embodiment, the use of public key cryptography may be used to exchange signed, authenticated messages between the device 200 and the computer 110, where user and root certificates may be employed to establish trust relationships. In some embodiments, the computer 110 may support a variety of algorithms and processes to accommodate devices having more and less cryptographic capability and/or varying needs for security, i.e. a disk drive may use more sophisticated methodologies than a mouse.

Once an algorithm is established, the computer 110 and the device 200 may exchange 406 data for use in subsequent verification. For example, the computer 110 and device 200 may use a Diffie-Hellman key exchange to create a shared secret for use with an advanced encryption standard (AES) algorithm. As mentioned above, public key technology may also be employed in the authentication process. A secure channel may be established between the computer 110 and the device 200 to further secure the binding process. Secure channels and trust relationships are known in the industry and are not discussed in more detail here. If the binding is successful 408, the process may be returned at block 410 to the main routine, for example, to block 302 of FIG. 4.

If the computer does not support binding at block 402, the no branch may be taken to block 412 and a message displayed indicating that the device 200 is not adapted for use in the computer 100. In some cases, the message may be in the form of lights on the device itself, for example, light emitting diodes (not depicted). Execution may continue at block 414. Similarly, when binding is not successful, the process may follow the no branch from 408 to 412 where a message representative of the entry point may be displayed. The device 200 may update criteria 414 used to determine if full capability operation of the device 200 should be allowed. As discussed above, the reasons for full operation may be to allow sales, installation and testing. Depending on the specific device and business considerations, the criteria may be a number of attempted uses, power on duration, a volume of data, a number of data write cycles, etc. In a simplistic example, the device 200 may allow 100 attempts to bind and each time execution passes through the update criteria block 414, the count may be decremented by one. When the criteria for full or normal operation without binding exist 416, the no branch of block 416 may be followed to block 410 and returned to the calling routine. In some embodiments, the device 200 may first set or reset itself for full or normal operation before returning at block 410. In another embodiment, the return 410 may include information regarding the binding status, success of the request, and the number of remaining binding attempts.

When the criteria for full or normal operation indicate that no further operation should be allowed without binding, the yes branch from 416 may be taken, a flag set 421, indicating the device is locked and a corresponding error message displayed 422. Similarly, operation from FIG. 4, block 302, may continue at block 422 where an appropriate error message may be displayed, the device locked 423. Execution ends 424 in a state where the device needs service before further operation. It should be noted that limited function operation may be the same as locked, but may be different. That is, limited function operation may allow the device 200 to operate in some fashion, where locked may completely disable the device 200, requiring service. The choice may be driven by business conditions but may also be part of an escalating response to failed binding or failed authentication. Subsequent rehabilitation of a locked device may require success receipt of a service administration request. As such execution may continue at FIG. 6.

Figure 6:
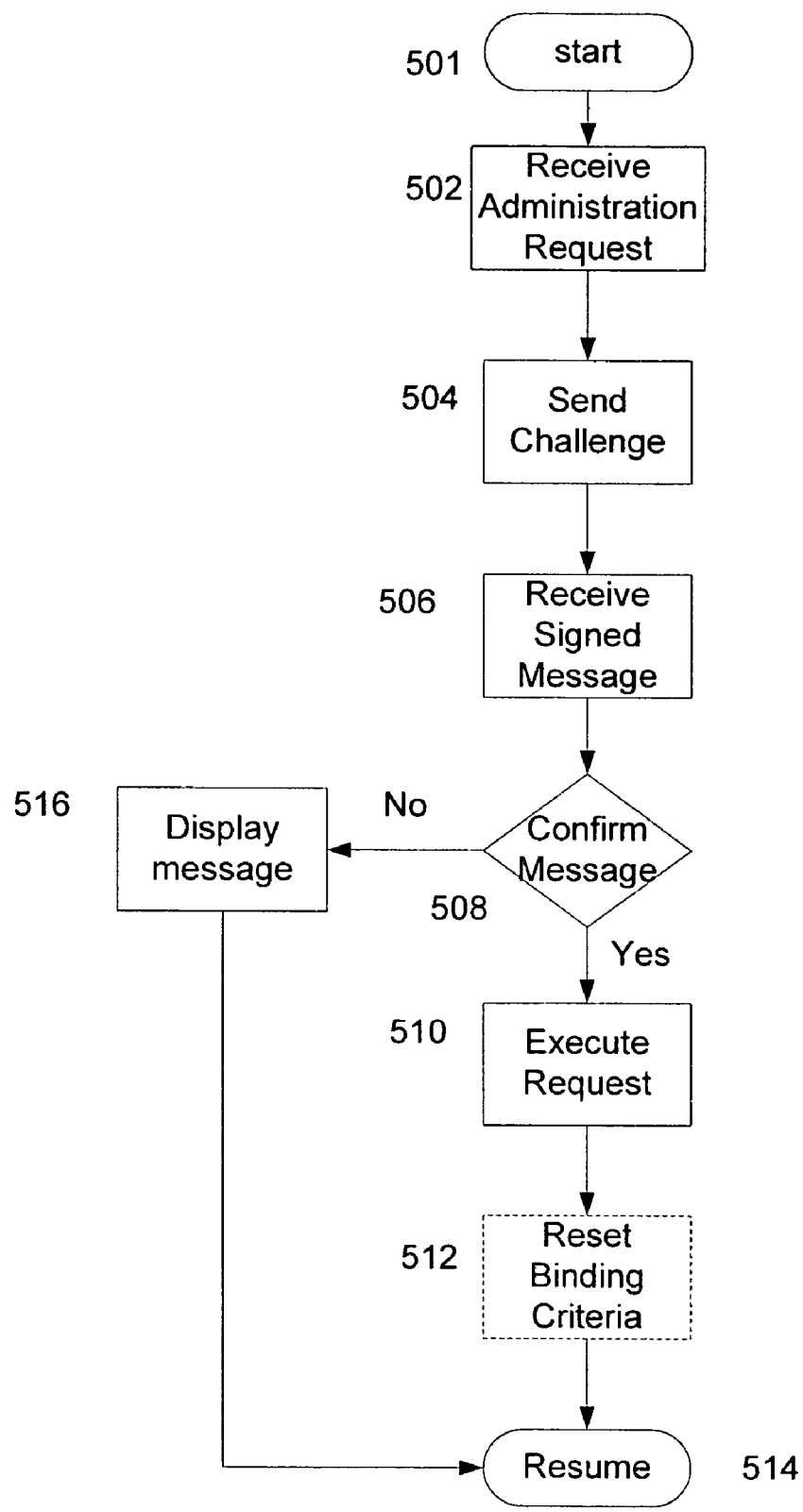
FIG. 6 is a flow chart depicting a method of unbinding a device to a computer.

FIG. 6 is a flow chart depicting a method of unbinding the device 200 from the computer 110. The method depicted in FIG. 4, may receive a service administration request message, for example, at FIG. 4, block 309, leading to block 314. The service administration request may involve a request to unbind the device 200 from the computer 110, a request to unlock a device 200 that is disabled or in a limited function mode, a request to adjust/reset the binding attempts, and the like. Starting at block 501, the request may be received 502, causing the device 200 to send 504 a challenge to the requesting entity, presumably the computer 110, but in some cases another entity (not depicted) such as a service provider website. Whether using symmetric or asymmetric cryptography, the challenge, in some cases a nonce or random number, a unique identifier, and/or a sequence number may be used to prevent replay attacks. The device 200 may then receive 506 a signed and/or authenticated message from the computer 110 or other entity. In an alternate embodiment, the request 502 may be a signed message from a trusted source and the device 200 may have sufficient cryptographic capability to authenticate the signed message without the need for a challenge-response. The device 200 may confirm 508 the message. The confirmation steps are known in the art and may include authenticating the author, for example, using a digital signature; checking the integrity of the message using, in an exemplary embodiment, a hash and signature; verifying a unique challenge, such as random or sequence number; or similar measures. When the message is confirmed, the yes branch from 508 may be followed and the requested action taken 510 The device 200 may then reset 512 the criteria for determining if the device 200 should be allowed to operate at full capacity without being bound, such as after being unbound or after a criteria reset request. Execution may be returned 514, for example, to FIG. 4, block 300.

When the message cannot be confirmed at block 508, the no branch may be taken. The requestor and/or the user may be notified 516 that an invalid service administration request was received. In an alternate embodiment, no response is made to avoid giving a hacker additional status information. The failed request may be logged for volume and velocity analysis and the routine returned at block 514 to the calling point, for example, FIG. 4, block 300, as above. Volume, i.e. the number of service administration requests, and velocity, the rate requests are received may be used to determine if a denial-of-service or similar attack is in progress. Service administration requests failing to meet volume/velocity or authentication requirements may be ignored and the device maintained in it current state.

The invention claimed is:

1. A component or peripheral device associated with a computer, the component or peripheral device comprising:
    a port configured to establish an initial binding with the computer via one of an internal bus and a direct, one-to-one coupling, the initial binding including:
        a message sent from the component to a monitor program running on the computer,
        a cryptographic algorithm configured for a subsequent authentication, wherein the cryptographic algorithm produces cryptographic data and the component and the monitor program exchange the cryptographic data in the subsequent authentication;
    a memory in the component or peripheral device configured to store authentication information including the cryptographic data, the authentication information used to generate a challenge that is sent to the computer; and
    a processor of the component or peripheral device coupled to the memory and the port, the processor programmed to:
        after the initial binding, power cycle the component;
        determine that a limited operating mode flag is cleared;
        send a challenge from the component to the monitor program;
        receive at the component a signed response incorporating the challenge;
        determine at the component that the signed response is incorrect;
        set the limited operating mode flag; and
        operate the component in a limited function operating mode until a successful challenge and response resets the component.

2. The component or peripheral device of claim 1, wherein the device is one of a display, a display controller, a rotating storage device, and a rotating storage device controller.

3. The device of claim 1, wherein the the port is further configured to establish the initial binding in response to a trigger, wherein the trigger is one of a timed interval, a number of power cycles, and a usage limit.

4. The device of claim 1, wherein the device operates in a full function mode through a boot cycle of the computer.

5. The device of claim 4, wherein the device initially operates in a full function mode and enters the limited function mode when failing to establish the initial binding with the computer after a time duration.

6. The device of claim 1, wherein the authentication occurs either during a specified time interval or with a network connection disabled.

7. The device of claim 1, the device responsive to a service administration request from the computer, the service administration request cryptographically signed.

8. A method of binding a component of a computer to that computer so that the component will not operate when not in direct communication with the computer, the method comprising:
    performing an initial binding between the component and computer including:
        sending a message from the component to a monitor program running on the computer;
        establishing a cryptographic algorithm for use for subsequent authentication; and
        exchanging cryptographic data between the component and the monitor program for use in subsequent verification between the component and the monitor program;
    after the initial binding, power cycling the component;
    determining that a limited operating mode flag is cleared;
    sending a challenge from the component to the monitor program;
    receiving at the component a signed response incorporating the challenge;

determining at the component that the signed response is incorrect;

setting the limited operating mode flag; and operating the component in a limited function operating mode that continues until reset by a successful challenge and response.

9. The method of claim 8, further comprising establishing a direct, one-to-one, communication path between the component and the monitor program.

10. The method of claim 8, further comprising resending a new challenge and receiving a corresponding signed response at an interval ranging from 5 to 10 minutes.

11. The method of claim 10, further comprising operating in a full function mode for a fixed period of time following starting the component and before sending the challenge.

12. The method of claim 11, further comprising disabling external data networks during the challenge/signed response period.

13. The method of claim 8, wherein the component is a disk drive mounted internally to the computer.

14. The method of claim 8, wherein the component is a monitor directly connected to a display controller, the display controller mounted internally to the computer.

* * * * *